Fig. 1.

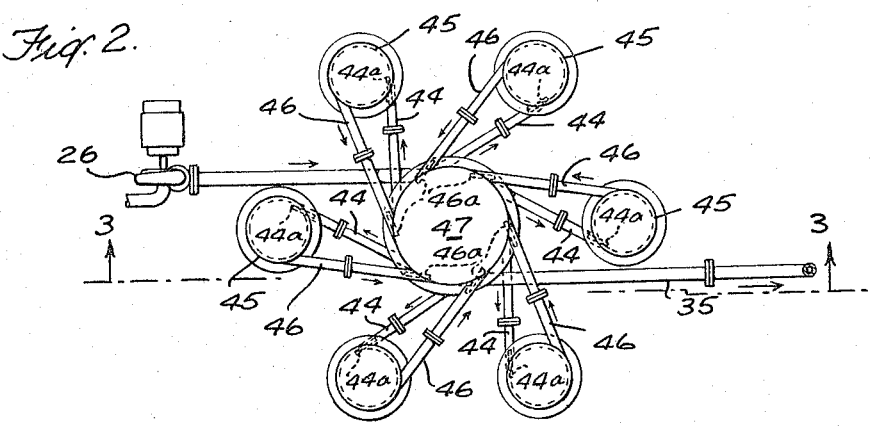
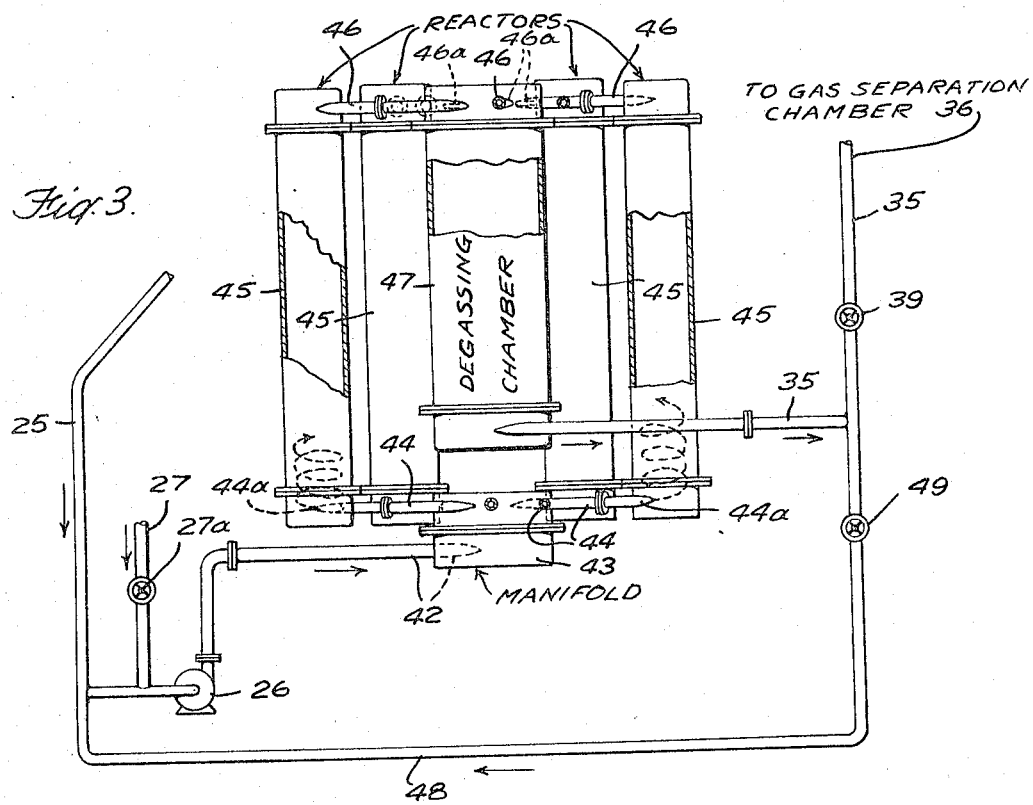

United States Patent Office 3,300,402
Patented Jan. 24, 1967

3,300,402
PURIFICATION OF PUTRESCIBLE UNSTABLE WASTES
Edward R. Grich, Wayne, and John W. Hood, Ridgewood, N.J., assignors to Purifax, Inc., Montclair, N.J., a corporation of New Jersey
Filed Jan. 9, 1964, Ser. No. 336,716
13 Claims. (Cl. 210—6)

This invention involves an improved process and apparatus for purification of putrescible unstable wastes, for the purpose of rendering the wastes non-odor forming and with sharply reduced biological oxygen demand. A second objective is to convert the material into a flocculent form which can easily be separated from the bulk of the water present by sedimentation or filtration.

The wastes to which this invention is applicable include sludges from sewage treatment plants involving primary sludges, secondary sludges, biological filter humus, activated sludge and the like; anaerobic digester sludges, scums and supernatant liquor, cesspool or septic tank pumpings, also various organic and inorganic by-products waste encountered in various industries, such as, paper mills, slaughter houses, food processing plants, canneries, textile mills, pharmaceutical plants, etc. The usual waste treatment methods, when applied to said materials, are either inadequate to accomplish the required purification or require high capital and operating costs per unit of material treated.

The active chemical agents used are molecular chlorine and nascent oxygen formed by action of chlorine on water. The chlorine may be introduced in either gaseous or liquid form.

The treatment of sewage and industrial wastes with chlorine is old and well known. However, prior methods and equipment have been inefficient in their utilization of chlorine for this purpose. For this reason many industrial plants and municipal sewage disposal plants have avoided the use of chlorine for this purpose.

In accordance with our invention, chlorine, preferably in the gaseous form, is introduced through a conventional metering device into the sludge and waste in a zone undergoing rapid agitation. The object is to provide for ready access of the chlorine to all particles of the sludge or waste. As is well known, in the presence of readily oxidizable matter chlorine also reacts directly with water releasing nascent oxygen and hypochlorous acid, both of which are powerful oxidants.

Introduction of the chlorine may be made into the inlet side of a suitable centrifugal pump. An alternative is to introduce the chlorine adjacent a high speed impeller disposed to agitate the material.

In accordance with our invention, immediately following introduction of the chlorine and subsequent to being thoroughly mixed, the sludge or waste is caused to undergo rapid circulation in an unobstructed vessel or vessels, the rate of circulation being sufficient to maintain in suspension in the waste insoluble or nitrogenous matter, carbonaceous matter, sand or bits of ground bone in the case of sewage, and titanium dioxide and clay or other filler in the case of industrial waste from a plant converting waste paper into paperboard.

In addition it has been found that continuance of the centrifugal action after oxidation has taken place causes the fine air bubbles attached to the solid particles to separate from the solid particles and coalesce. The air or gas bubbles upon leaving the reactors and progressing into a zone where the pressure is lower, expand and separate from the sludge mass. As a result, sedimentation of the solid particles can take place in the receiving clarifier. Of further importance it has been found that in such instances where dewatering of the sludge from the reactors is desirable on mechanical dewatering equipment or sand beds, removal of the fine air bubbles attached to the solid particles increases the rate of separation of the solids from the liquids by three fold or more.

In the case of sanitary sewage our improved chemical oxidation process may be utilized in a number of ways. One arrangement would be in combination with a conventional aerobic-anaerobic sewage treatment installation, whereby the chemical oxidation operation would be carried out on the supernatant liquor from the anaerobic digester.

Another arrangement would be in treating the waste sludge discharged from a secondary aerobic process.

Another arrangement would be in simultaneously treating both the supernatant liquor and waste secondary sludge from a conventional sewage treatment plant.

The nature of the invention will be better understood by referring to the following description taken in connection with the accompanying drawings in which a specific embodiment has been set forth for purposes of illustration.

In the drawings:
FIG. 1 is a diagrammatic view illustrating the invention as applied to a system for treating sewage;
FIG. 2 is a top plan view of a treating apparatus suitable for use in the chlorination stage; and
FIG. 3 is a vertical section taken on the line 3—3 of FIG. 2 with parts in elevation.

Referring to the drawings more in detail, the raw sewage influent which has been passed through a filter to remove large objects and through a settling chamber to settle out most of the grit and sand is introduced through line 1 into mixing chamber 2.

The overflow from mixing chamber 2 flows through line 3 into the primary clarifier 4. Effluent from the primary clarifier 4 passes through line 5 to a conventional aerobic process 6.

The material after treament in the aerobic process is passed through line 7 to a secondary clarifier 8 from which the effluent is discharged to waste through line 9 and from which the secondary sludge is fed by pump 10 and line 11 having a control valve 12 to mixing tank 13.

Settled primary sludge from primary clarifier 4 is pumped by a pump 16 and line 17 into the upper zone of an anaerobic digester 18. This digester 18 is provided with a gas outlet 20 at the top for noxious gases such as methane and hydrogen sulfide which are burned.

The sludge from the anaerobic digester 18 is discharged to waste through line 19. The foul supernatant liquor from the anaerobic digester 18 is withdrawn through line 21 having a control valve 22 and discharged into mixing tank 13 wherein it may be mixed with the waste sludge from the aerobic process.

The material for oxidation treatment is fed from the tank 13 through line 25 to the inlet of pump 26 which is of chemically resistant construction.

By closing alternately valves 12 and 22 the chemical oxidation process may be carried out on the effluent from the anerobic digester or the sludge from the aerobic treatment process.

Chlorine, preferably in gaseous form, after passing through a conventional metering device (not shown) is passed through line 27 having a valve 27a into the stream of material in the pipe 25, and into the pump 26, wherein the material is subjected to rapid agitation and forced through a tangential inlet nozzle 28 into reactor vessel 29 wherein rapid circulation with a reduction in pressure is maintained by the centrifugal force of the entering stream. The reactor 29 is free from baffles which would impede the circulation of the material and which might tend to cause separation of the particles contained therein. The reactor forms an unimpeded circulation zone wherein the rapid circulation of the liquid maintains all particles in suspension and maintains an intimate contact of the oxidant with the material being processed.

From reactor 29 the chemically oxidized waste is passed through a line 30 and tangential nozzle 31 into reactor 32, then into reactors, 33 and 34, in all of which the chemically oxidized waste is caused to undergo rapid circulation with successive reductions in pressure due to the centrifugal force imparted by the velocity of the material leaving pump 26. A booster pump (not shown) may be inserted in the line 30 between reactors 29 and 32 if found necessary by reason of unusually heavy concentrations of solid matter in the waste. Reactors 29, 32, 33 and 34 are constructed with linings of acid-resistant rubber, and are unobstructed.

From reactor 34 the chemically oxidized waste passes through line 35 to a gas separating tank 36 which is open to the atmosphere and in which the occluded gases are separated from the waste material and from which the waste material is fed through line 37 into the mixing tank 2. A recirculation line 38 extends from the line 35 at the exit end of the reactor 34 to the line 25 on the input side of the pump 26. The flow through the lines 35 and 38 is controlled by valves 39 and 40 respectively.

At control valve 39 a bleed valve (not shown) is provided to permit withdrawal of samples of the chlorinated waste. It has been found that the amount of chlorine introduced through line 27 should be adjusted and so controlled that the acidity of the chemically oxidized waste passing through control valve 39 lies within the pH 2.5 to pH 6.5 range.

The amount of chlorine introduced through line 27 will in general fall within the range of from 100 p.p.m. to 3000 p.p.m.

The reactor 34 may act as a degassing chamber since the chemical oxidant has normally been consumed by the time the sludge reaches the end of reactor 33. The feed of the sludge through the nozzles in the tangential entrance lines to the reactors provides agitation and causes the sludge to travel rapidly in a spiral path along the reactor. At the same time the sudden change in pressure from a relatively high degree in the nozzles to a much lower degree in the reactors combined with said agitation causes the absorbed air or gas bubbles to expand and separate from the solid particles.

Removal of air or gas bubbles attached to solid particles is extremely beneficial when the treated sludge is to be subjected to sedimentation apparatus since the settling rate, clarity of the separated liquid and attainable solids concentration are all adversely affected by air attached to the solids particles.

The introduction of the chemically oxidized waste material into the mixing tank improves the flocculation in the primary clarifier 4. It has also been found that the material assists in breaking the surface tension of the grease and other materials in the waste so that they settle out in the clarifier instead of forming a skim on the surface which would have to be removed.

By using this process it will be found that substantially complete deodorization of the waste passing through the chemical oxidation system will be effected in not over 10 minutes.

In the embodiment of FIGS. 2 and 3 the reaction vessels are connected in parallel and are disposed concentrically around an input manifold and an output degassing chamber. In this form the line 25 from the mixing chamber 13 leads to a centrifugal pump 26, the output side of which is connected by a line 42 tangentially to a cylindrical manifold chamber 43 so as to cause the liquid to whirl rapidly in said chamber. Chlorine is introduced into the liquid in the pump 26 by the line 27 as in FIG. 1.

A plurality of tangential outlet pipes 44 extend from the manifold chamber 43 to a series of reactor vessels 45 which are disposed concentrically around the manifold 43.

The vessels 45 are cylindrical and are disposed vertically with the inlet pipes 44 communicating through tangentially disposed nozzles 44a with the lower ends of the vessels so that the liquid circulates centrifugally around and upward in said vessels. As in the case of the reactor of FIG. 1 the vessels 45 are unimpeded internally so that the flow of liquid in uninterrupted and maintains solids in suspension during the reaction time.

The liquid is discharged from the upper ends of the vessels 45 through pipes 46 and forced through tangential inlet nozzles 46a to a degassing chamber 47 wherein the material is again subjected to rapid circulation in an unobstructed zone with sudden reduction in pressure from a relatively high degree in the nozzles to a much lower degree in the chamber thereby causing the attached air bubbles to expand and coalesce, and, being lighter than the suspended matter, to collect toward the axis of the spirally rotating mass of material. The separated air or gas bubbles upon leaving the degassing chamber to not intimately re-mix with the material nor again attach themselves to the solid particles. As the treated liquid is discharged through line 35 to the gas separating tank 36 as in FIG. 1 the bubbles float to the surface and break. A recirculating pipe 48 controlled by a valve 49 extends from the line 25 on the input side of the pump 26 to permit controlled recirculation when additional reaction time is required.

The following specific examples will illustrate our invention.

As a further specific example the pressure drop across each nozzle may be 5.75 p.s.i. when handling sludge of a consistency of .75% solids. In the system shown in FIG. 1 where there are four reactors in series, the pressure entering the first reactor may be 27 p.s.i. and may be 21.25 p.s.i. in the first reactor, 15.5 p.s.i. in the second reactor, 9.75 p.s.i. in the third reactor and 4 p.s.i in the fourth reactor The total pressure entering a series of reactors will vary depending on the consistency of the sludge and the number of reactors in the series. In handling sludge at 5% solids, the drop across each nozzle may be 28 p.s.i., in which event two nozzles in series would be used such as shown in FIGS. 2 and 3 of the drawings.

*Example 1.—Sewage purification*

This example involves processing waste secondary sludge which contains approximately 0.6% suspended solids of which 85% is volatile matter. The oxidation reduction potential (hereafter referred to as ORP) is in the range of plus 200 milivolts to plus 300 milivolts Eh (according to the hydrogen electrode).

The chlorine demand of this waste is in the range of 420 p.p.m.

The temperature range is from 50° to 70° F. The rate of flow of sludge to the chemical oxidation unit is up to 60 g.p.m.

The daily quantity to be handled is 10,000 to 30,000 gallons, depending on process control. The amount of chlorine required to treat the average charge of sludge is 70 pounds. This sludge may be foul anaerobic digestor supernatant liquor which is 0.9% suspended solids, and consisting of decomposing organic matter of which about 60% is volatile matter. The ORP is in the range of minus 100 to minus 200 milivolts. The temperature range is 70° to 100° F. The charging rate of this liquor is up to 40 gallons per minute. The daily quantity to be handled in the chemical oxidation unit is 5,000 to 10,000 gallons depending on processing control. The chlorine demand of this supernatant liquor is in the range of 500 p.p.m., requiring 31 pounds of chlorine to treat the average daily production of 7500 gallons.

Raw sludges have negative to low reduction potentials, whereas wastes leaving our chemical oxidation unit have positive OR potentials in the magnitude of 1,000 milivolts Eh. (Datum: Hydrogen electrode.)

*Example 2.—Paper or boxboard mill waste treatment*

This example involves processing excess secondary sludge from an aerobic process fed with waste from a paper pulp primary recovery unit, combined with the underflow from another pulp recovery unit designated as a water extractor. The combined sludge has a consistency of about 3.5% solids, a temperature of 90° F. to 110° F. and a daily production volume of 72,000 gallons. The rate of the chemical oxidation unit is 50 gallons per minute. The chlorine demand is 400 p.p.m. requiring 230 pounds of chlorine per day. The ORP is in the magnitude of plus 200 milivolts. The pH of the untreated material is about 7.0 and the Biochemical oxygen demand is 2000 to 3000 p.p.m. The pH of the treated material is 2.5 to 6.5.

What is claimed is:

1. In a method of purifying waste material containing putrescible matter which comprises subjecting said material in a clarifying zone to conditions to cause flocculation, separating the flocculated components from the suspending liquid, treating the effluent therefrom in an aerobic treating zone wherein a sludge component is separated out from an effluent, removing the last effluent to waste, the improvement which comprises treating the separated sludge with a chemical oxidant whereby oxidization of the putrescible matter therein is effected as a result of unimpeded and rapid circulation of the sludge while maintaining all of the particles of said sludge in suspension and further maintaining said chemical oxidant in intimate contact with the said sludge being processed for a time sufficient to complete the chemical oxidation reaction, thereafter forming an effluent, said effluent having a pH value of from 2.5 to 6.5, and introducing said last effluent into the initial waste material in advance of said clarifying zone for expediting the flocculation therein.

2. The method set forth in claim 1 in which the chemical oxidant is introduced in a quantity of the order of 100 to 3000 p.p.m.

3. The method set forth in claim 2 in which the chemical oxidant is chlorine.

4. In a method of purifying waste material containing putrescible matter which comprises treating said material in a clarifying zone under conditions to cause flocculation and to separate the flocculated material from an effluent, treating the flocculated material in an anaerobic digesting zone under conditions to digest the putrescible matter and separate the same from the supernatant liquid, removing the sludge to waste, the improvement which comprises subjecting the supernatant liquid to the action of a chemical oxidant wherein oxidation of the putrescible matter, said putrescible matter being residual from the anaerobic treatment, is effected as a result of unimpeded and rapid circulation of the supernatant liquid while maintaining all of the particles of said supernatant liquid in suspension and further maintaining said chemical oxidant in intimate contact with the said supernatant liquid being processed for a time sufficient to complete the chemical oxidation reaction, thereafter forming an effluent, said effluent having a pH value of from 2.5 to 6.5, introducing said last effluent into the incoming waste material in advance of said clarifying zone for expediting flocculation therein.

5. The method set forth in claim 4 in which the chemical oxidant is introduced in a quantity of the order of 100 to 3000 p.p.m.

6. The method set forth in claim 5 in which the chemical oxidant is chlorine.

7. In a method of purifying waste material containing putrescible matter which comprises treating said material in a clarifying zone under conditions to cause flocculation and to form a primary sludge and an effluent, subjecting said effluent to treatment in an aerobic treating zone under conditions to produce a secondary sludge and an effluent, removing said effluent to waste, treating the primary sludge from said last clarifying zone in an anaerobic digestion zone under conditions to produce digested sludge and supernatant liquid, passing said digested sludge to waste, the improvement which comprises selectively treating the supernatant liquid from said anaerobic digestion zone and the waste secondary sludge from said aerobic treating zone with a chemical oxidant wherein oxidation of the putrescible matter therein, is effected as a result of unimpeded and rapid circulation of the supernatant liquid and waste secondary sludge while maintaining all of the particles of said supernatant liquid and waste secondary sludge in suspension and further maintaining said chemical oxidant in intimate contact with the said supernatant liquid and waste secondary sludge being processed for a time sufficient to complete the chemical oxidation reaction, thereafter forming an effluent, said effluent having a pH from 2.5 to 6.5 and introducing said last effluent into the incoming waste material in advance of the clarifying zone for expediting flocculation therein.

8. The method set forth in claim 7 in which the chemical oxidant is introduced in a quantity of the order of 100 to 3000 p.p.m.

9. The method set forth in claim 8 in which the chemical oxidant is chlorine.

10. In a method of purifying waste material containing putrescible matter the improvement which comprises treating said material with a chemical oxidant in a zone of rapid agitation and maintaining an unimpeded and rapid circulation of said material without sudden change in direction so as to maintain insoluble material in suspension therein for a time to effect chemical oxidation of the putrescible matter, subsequently reducing the pressure and continuing the rapid circulation at such reduced pressure to cause the fine air or gas bubbles attached to the suspended solid particles to separate and coalesce whereby said coalesced air bubbles separate readily from the sludge when released to a zone of lower pressure.

11. The method set forth in claim 10 in which the zone of rapid agitation includes a centrifugal pump and the zone of rapid circulation includes cylindrical chambers wherein the material is introduced tangentially and caused to flow peripherally by centrifugal force as it advances to an axial outlet.

12. The method as set forth in claim 10 wherein said materials after treatment with a chemical oxidant is released through a nozzle tangentially into a separate chamber at reduced pressure whereby the sludge is maintained in rapid circulation without sudden change in direction for a time to complete separation of substantially all of the air or gas bubbles from the solid particles, causing said air or gas bubbles to coalesce and then discharging said material from said chamber to a second chamber whereby said coalesced bubbles separate from the material.

13. A closed system for treating waste material containing putrescible matter therein which comprises a centrifugal pump, means introducing said material to said pump under pressure, means introducing a chemical oxidant into said pump to be reacted with the putrescible matter in a zone of rapid agitation wherein intimate contact of the said chemical oxidant with the putrescible matter is maintained therein, a sealed cylindrical treating vessel, means introducing the material from said pump tangentially into said vessel creating rapid circulation thereof by centrifugal force as the material advances, said vessel having a discharge opening for said material.

References Cited by the Examiner
UNITED STATES PATENTS

| | | | |
|---|---|---|---|
| 1,902,078 | 3/1933 | Jenks | 210—512 X |
| 2,043,458 | 6/1936 | Windecker et al. | 210—63 |
| 2,254,953 | 9/1941 | Thomas | 210—6 X |
| 2,326,303 | 8/1943 | Moerk et al. | 210—512 X |
| 2,359,004 | 9/1944 | Schlenz et al. | 210—8 X |
| 3,060,118 | 10/1962 | Schoeffel | 210—63 |

FOREIGN PATENTS 57,175   1/1940   Denmark.

OTHER REFERENCES

Keefer: Sewage-Treatment Works, 1940, First Edition, McGraw-Hill, New York, pp. 378–415, pp. 387–393 and 397–400 particularly relied on.

MORRIS O. WOLK, *Primary Examiner.*

MICHAEL E. ROGERS, *Examiner.*